United States Patent
Schutten et al.

(10) Patent No.: US 9,343,939 B2
(45) Date of Patent: May 17, 2016

(54) ELECTRIC MOTOR STRUCTURE TO MINIMIZE ELECTRO-MAGNETIC INTERFERENCE

(75) Inventors: Michael Joseph Schutten, Rotterdam, NY (US); Manoj Ramprasad Shah, Latham, NY (US); Satish Prabhakaran, Albany, NY (US); Robert James Thomas, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 445 days.

(21) Appl. No.: 12/977,800

(22) Filed: Dec. 23, 2010

(65) Prior Publication Data
US 2012/0161570 A1 Jun. 28, 2012

(51) Int. Cl.
| | |
|---|---|
| H02K 3/34 | (2006.01) |
| H02M 1/44 | (2007.01) |
| H02K 11/02 | (2016.01) |
| H02K 3/487 | (2006.01) |
| H02K 11/00 | (2016.01) |
| H02M 1/12 | (2006.01) |

(52) U.S. Cl.
CPC ............... *H02K 3/345* (2013.01); *H02K 3/487* (2013.01); *H02K 11/0005* (2013.01); *H02K 11/022* (2013.01); *H02M 1/44* (2013.01); *H02M 2001/123* (2013.01)

(58) Field of Classification Search
CPC ........... H02K 3/345; H02K 3/34; H02M 1/44; H02M 2001/123
USPC ............. 310/215; 318/492, 558; 333/12, 177, 333/181
See application file for complete search history.

(56) References Cited

U.S. PATENT DOCUMENTS

| | | | | |
|---|---|---|---|---|
| 1,524,558 | A | * | 1/1925 | Kincaid .................... 310/211 |
| 2,457,740 | A | * | 12/1948 | Sigmund et al. ........... 310/215 |
| 3,130,335 | A | * | 4/1964 | Rejda ...................... 310/215 |
| 3,705,365 | A | * | 12/1972 | Szabo et al. ................ 333/12 |
| 4,041,364 | A | * | 8/1977 | Gauper, Jr. .................. 363/15 |
| 4,486,506 | A | * | 12/1984 | Kenjo et al. ............ 428/475.2 |
| 5,481,151 | A | | 1/1996 | Stacy et al. |
| 5,661,353 | A | * | 8/1997 | Erdman et al. .............. 310/86 |
| 5,821,649 | A | | 10/1998 | Langhorst |
| 5,821,652 | A | * | 10/1998 | Hyypio ...................... 310/83 |
| 6,011,338 | A | | 1/2000 | Bell et al. |

(Continued)

FOREIGN PATENT DOCUMENTS

| | | |
|---|---|---|
| GB | 2287363 A | 9/1995 |
| GB | 2318758 A | 5/1998 |

(Continued)

OTHER PUBLICATIONS www.reliance.com, "Motors & Drives for Cleanroom Applications", 8 pp, Apr. 7, 2000.

(Continued)

*Primary Examiner* — Burton Mullins
(74) *Attorney, Agent, or Firm* — Pabrita K. Chakrabarti

(57) ABSTRACT

An electric motor is configured with a stator core assembly that includes a stator core having a plurality of winding slots. A plurality of stator windings pass through the plurality of winding slots that include slot liners configured to provide electrostatic shields surrounding the plurality of stator windings. The electrostatic shields are referenced to an electrical location to reduce common mode currents associated with the electric motor.

34 Claims, 14 Drawing Sheets

(56) References Cited

U.S. PATENT DOCUMENTS

| | | | | |
|---|---|---|---|---|
| 6,134,126 | A * | 10/2000 | Ikekame et al. | 363/39 |
| 6,202,285 | B1 * | 3/2001 | Bell | 29/596 |
| 6,756,712 | B1 * | 6/2004 | Schuren | 310/71 |
| 7,211,919 | B2 | 5/2007 | Kalsi et al. | |
| 7,250,700 | B2 | 7/2007 | Maki-Ontto | |
| 7,606,052 | B2 * | 10/2009 | Akagi | 363/40 |
| 7,741,798 | B2 * | 6/2010 | Lucas | 318/400.24 |
| 7,952,251 | B2 * | 5/2011 | Chretien et al. | 310/215 |
| 8,193,889 | B2 * | 6/2012 | Pyrhonen et al. | 336/84 R |
| 8,269,434 | B2 * | 9/2012 | Welchko et al. | 318/139 |
| 2007/0278988 | A1 * | 12/2007 | De et al. | 318/801 |
| 2010/0007235 | A1 | 1/2010 | Chretien et al. | |
| 2010/0090630 | A1 * | 4/2010 | Chida et al. | 318/400.24 |
| 2010/0219902 | A1 * | 9/2010 | Schutten et al. | 333/12 |
| 2013/0162370 | A1 * | 6/2013 | Lai et al. | 333/177 |

FOREIGN PATENT DOCUMENTS

| | | |
|---|---|---|
| JP | 594003 A | 1/1984 |
| JP | 10135680 A | 5/1998 |
| JP | 2000333396 A | 11/2000 |
| JP | 2001204136 A | 7/2001 |
| JP | 2005518777 A | 6/2005 |

OTHER PUBLICATIONS

EP Search Report and Written Opinion issued May 8, 2014 in connection with corresponding EP Patent Application No. 11193656.3.
Unofficial English Translation of Chinese Office Action issued in connection with corresponding CN Application No. 201110461806.7 on Jan. 16, 2015.
Unofficial English Translation of Japanese Office Action issued in connection with corresponding JP Application No. 2011277762 on Sep. 1, 2015.

* cited by examiner

ELECTRIC MOTOR STRUCTURE TO MINIMIZE ELECTRO-MAGNETIC INTERFERENCE

BACKGROUND

The present invention is directed to electric motors, and more particularly to a structure for an electric motor that makes the electric motor more immune to creating electromagnetic interference (EMI).

The stator of an electric motor 12 is energized by a switching inverter 10 such as depicted in FIG. 1. The switching inverter 10 has very fast transitions, with a fast dv/dt applied to the stator windings. The electric motor 12 has multiple capacitive paths. Two of these capacitive paths are of primary concern. They include the path between the stator windings and the motor frame, Cwf, (ground) capacitance (14), and the path between the stator windings and the rotor (17), Cwr, capacitance (16). A very rapid dv/dt is applied across each of these capacitances, Cwf, Cwr, causing an electrical current to flow through these capacitive paths when the inverter 10 switches.

Current flowing in these capacitive paths causes two major problems. These problems are associated with EMI as well as excessive bearing currents. If for example, the inverter 10 is connected to a 250 VDC link, and the semiconductor switches turn on and off in 50 nsec, the dv/dt will be $5 \times 10^9$ V/sec. Typical stator winding to ground capacitance is about one (1) to about ten (10) nF. Thus, assuming 2 nF of capacitance, 10 A of peak current will be flowing through this path. This is a substantial amount of common-mode current; and it requires very large, expensive, heavy common-mode filters to attenuate this current. Current that flows through the Cwr path will flow to ground through the rotor bearings. This current can cause degradation of the bearings.

In view of the foregoing, it would be advantageous and beneficial to provide a motor structure that reduces EMI problems as well as common-mode currents that flow into the rotor bearings and electrical ground structures generally associated with conventional electric motor structures.

BRIEF DESCRIPTION

The present invention is directed to an electric motor structure. According to one embodiment, an electric motor comprises:
  a stator core comprising a plurality of winding slots; and
  a plurality of slot liners, each slot liner disposed at least partially within a corresponding winding slot, wherein each slot liner comprises an electrically conductive layer electrically insulated from the stator core, and further wherein the plurality of conductive layers are electrically connected together in parallel to provide a common connection point.

According to another embodiment, an electric motor comprises:
  a stator core comprising a plurality of winding slots;
  a plurality of stator windings passing through the plurality of winding slots; and
  a plurality of slot liners, each slot liner comprising an electrically conductive layer disposed between a corresponding stator winding and the stator core, each conductive layer electrically insulated from its corresponding stator winding and the stator core, wherein the plurality of conductive layers being electrically connected together in parallel to provide a common connection point.

According to yet another embodiment, an electric motor comprises:
  a stator core comprising a plurality of winding slots;
  a plurality of stator windings passing through the plurality of winding slots; and
  a plurality of stator slot liners, each slot liner configured to provide an electrostatic shield at least partially surrounding a corresponding stator slot winding, wherein the plurality of electrostatic shields are connected together in parallel to provide a common connection point.

Still another embodiment comprises an electric motor configured with a plurality of stator slot liners, each slot liner configured to provide an electrostatic shield at least partially surrounding a corresponding stator winding, wherein the plurality of electrostatic shields are connected together in parallel and referenced to an electrical location to reduce common mode currents associated with the electric motor.

DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 2:
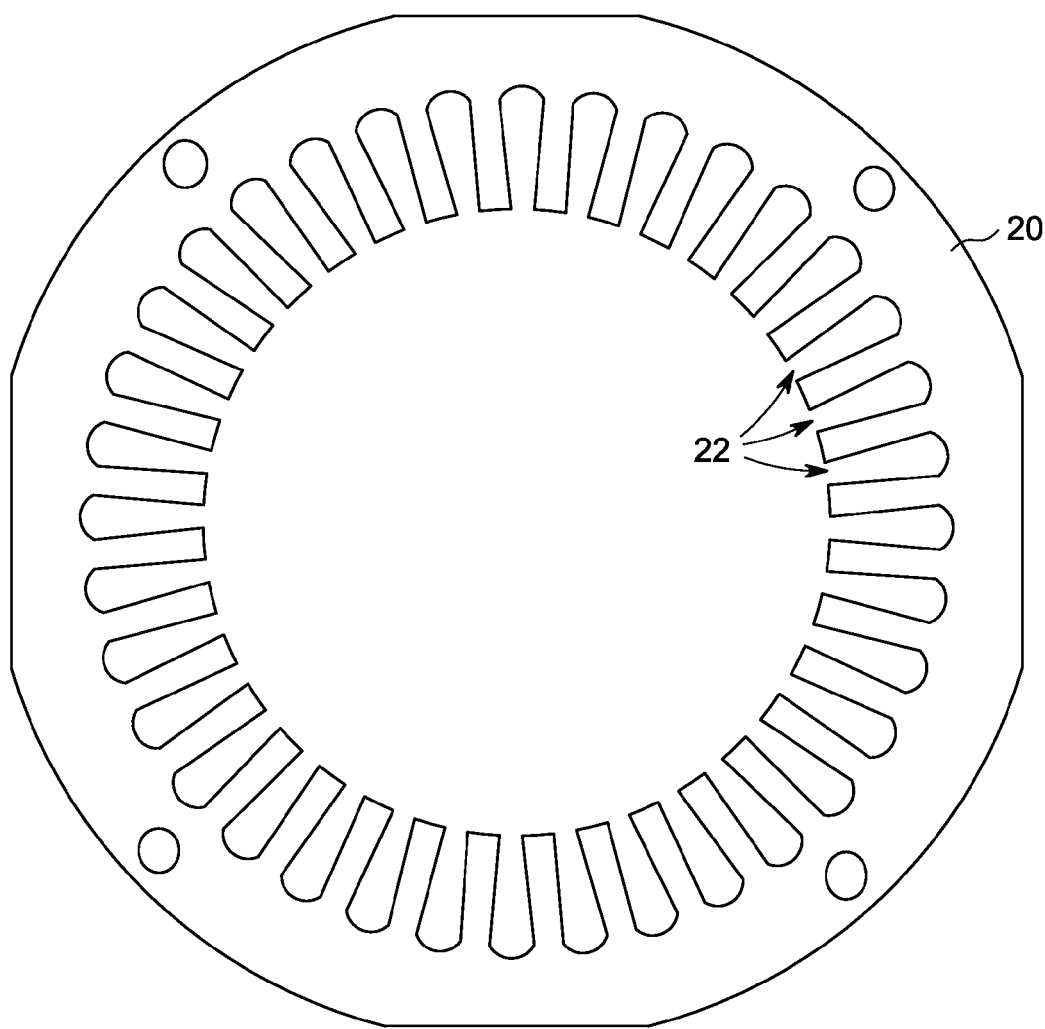
FIG. 2 illustrates a typical electric motor stator lamination structure.

FIG. 2 illustrates a typical electric motor stator lamination structure 20. Lamination structure 20 comprises a plurality of winding slots 22.

Figure 3:
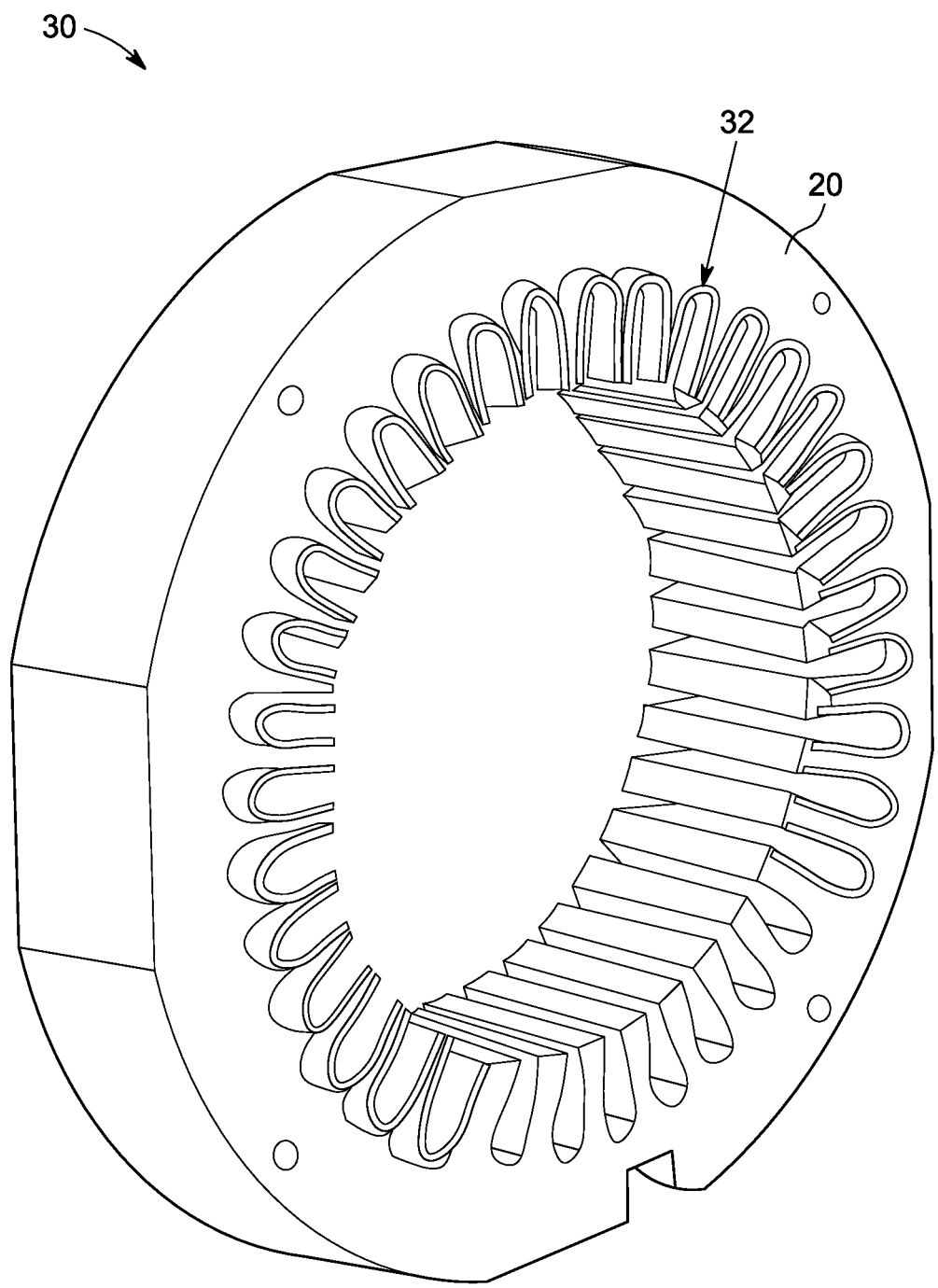
FIG. 3 illustrates a typical electric motor stator lamination stackup structure with slot liners.

FIG. 3 illustrates a typical electric motor stator lamination stackup structure 30 comprising a plurality of laminations 20. Lamination stackup structure 30 further comprises a plurality of slot liners 32.

Figure 4:
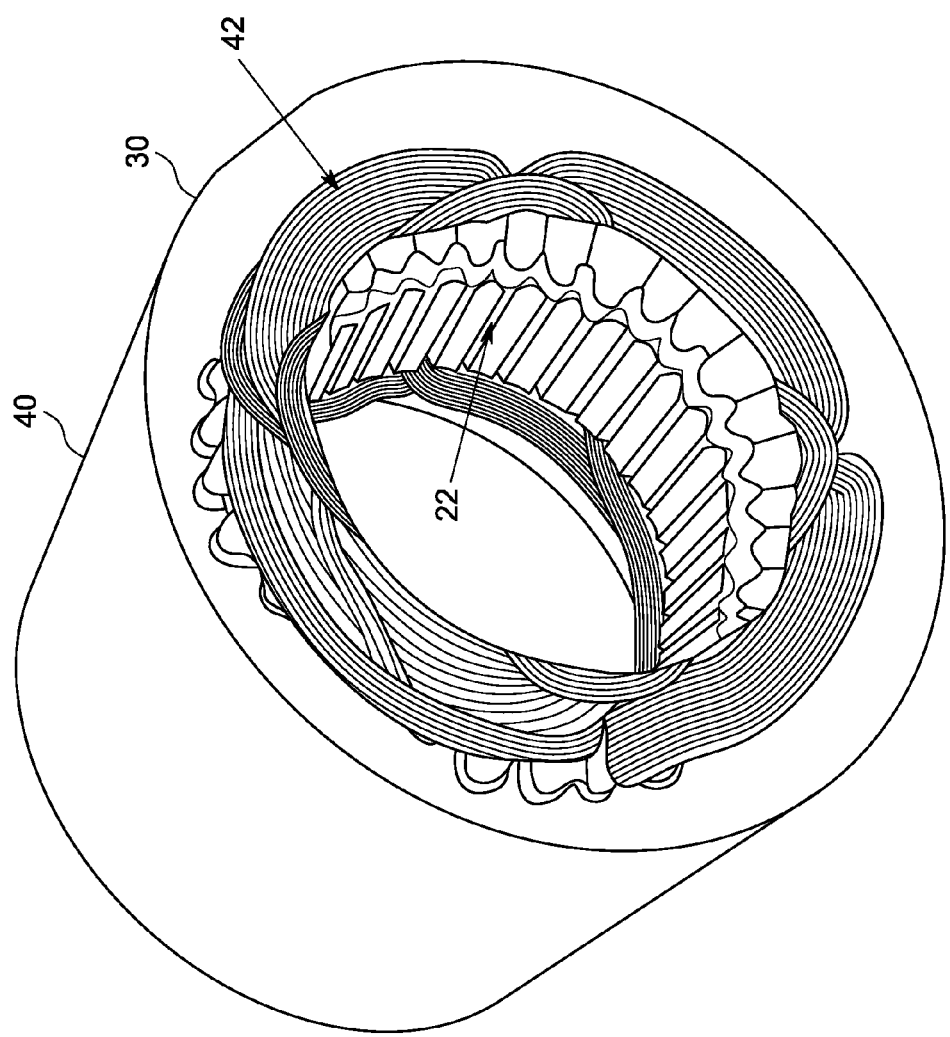
FIG. 4 illustrates the stator lamination stackup structure depicted in FIG. 3 with stator windings placed in the stator slots.

FIG. 4 illustrates a typical stator assembly 40. Stator assembly 40 comprises the stator lamination stackup structure 30 depicted in FIG. 3. Stator assembly 40 further comprises stator windings 42 placed in the stator slots 22.

Figure 5:
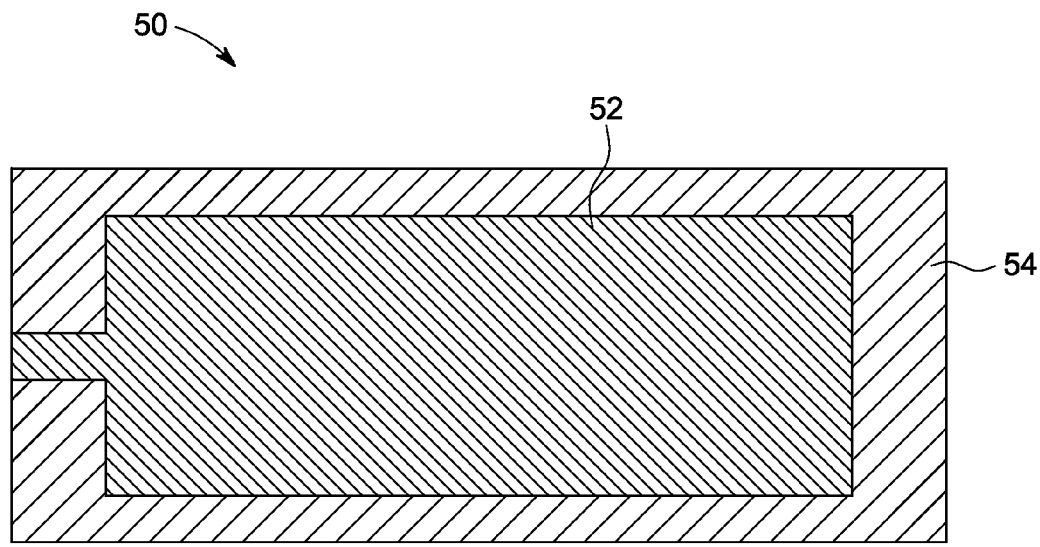
FIG. 5 illustrates a top view of a stator slot liner, according to one embodiment of the invention.

FIG. 5 illustrates a top unfolded view of a stator slot liner 50, according to one embodiment. The use of a stator slot liner having a structure such as shown in FIG. 5 provides one or more electrostatic shields around at least a portion of the stator windings 42 of a corresponding electric motor. The stator slot liner/shield 52 provides a conduction path for capacitive currents that would otherwise flow into an electric motor stator and rotor assemblies.

Figure 6:
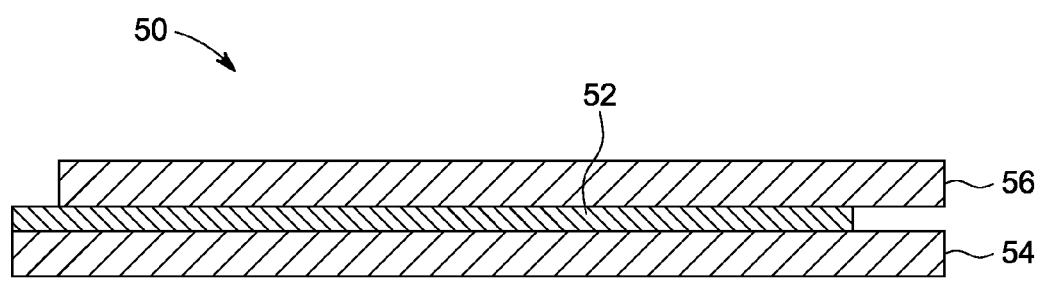
FIG. 6 illustrates a side view of the stator slot liner depicted in FIG. 5.

More specifically, the electrostatic shield 52 provided via stator slot liner 50 allows problematic common-mode currents to instead flow to a much better electrical path, thus greatly reducing the associated EMI problems. This approach also reduces the common-mode currents that would flow into the bearings of the motor and cause bearing failures. The electrostatic shield provided by each slot liner 50 advantageously prevents capacitive currents from flowing into the ground structure and creating common-mode EMI currents, and also prevents capacitive currents from flowing into the bearing assembly and causing bearing fluting and pitting problems, thus leading to increased motor bearing life. According to one aspect, the capacitive common-mode current is redirected to flow directly back to the inverter 10 instead of ground. In this way, any required common-mode filter is smaller, and the system is much less prone to unintentional electromagnetic radiation. FIG. 6 illustrates a side view of the stator slot liner 50 depicted in FIG. 5.

According to another embodiment, stator slot liner 50 comprises an electrostatic shield 52 and only one layer of insulation material. The single layer of insulation material may consist of layer 54 or layer 56. In this embodiment, the surface of the electrostatic shield 52 that is devoid of any insulation material relies on the winding insulation itself to provide the requisite insulation between the electrostatic shield and any corresponding windings. Insulation layers 54, 56 may each have a thickness between about 0.001 inch and about 0.05 inch according to one embodiment.

Figure 7:
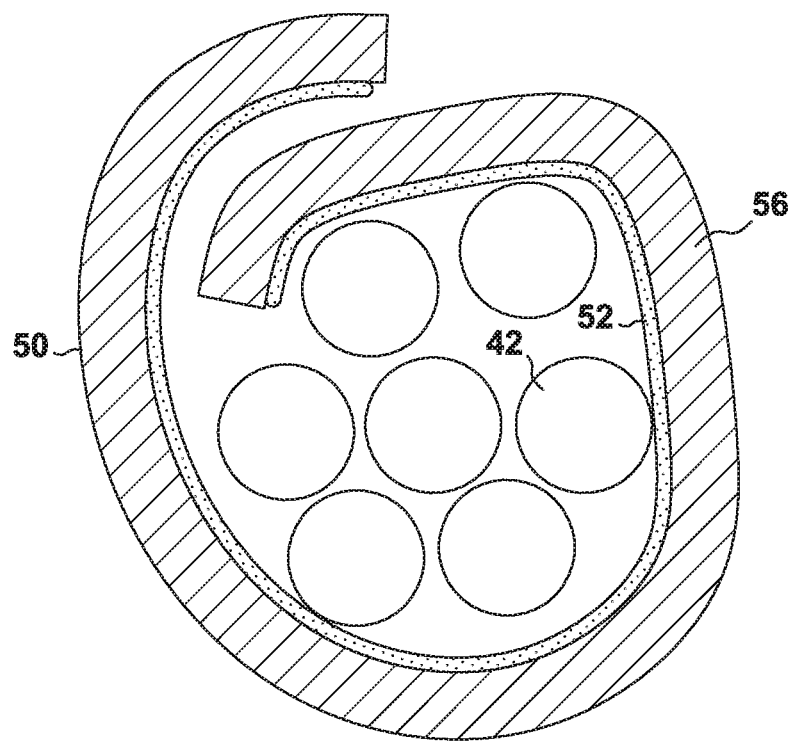
FIG. 7 illustrates a side cutout view of the motor stator windings inside the slot liner depicted in FIGS. 5 and 6, according to one embodiment.

FIG. 7 illustrates a side cutout view of the motor stator windings 42 inside the slot liner 50 depicted in FIGS. 5 and 6, according to one embodiment. Looking again at FIGS. 5 and 6, slot liner 50 comprises a thin layer 52 of copper or other suitable electrical conductor, e.g. copper or aluminum, that may comprise a thickness between about 0.0001 inch and 0.005 inch, sandwiched between two layers of insulation material 54, 56. The electrical conducting layer 52 may be very thin to substantially reduce induced eddy currents in the conducting layer 52, and may comprise a thickness between about 0.0001 inch and 0.005 inch as stated herein, while retaining the desired electrostatic shielding properties. According to one aspect, the insulation layer between the motor stator windings 42 and the thin conducting layer 52, e.g. copper foil layer, may comprise a thickness between about 0.001 inch and about 0.05 inch as stated herein, and constructed of a material with a low relative permittivity, such as without limitation, Polytetrafluoroethylene (PTFE), which has a relative permittivity of about 2.1. These properties substantially minimize the capacitance between the stator windings 42 and the copper foil shield/conducting layer 52.

Stator slot liner 50 may comprise an electrostatic shield 52 and only one layer of insulation material, as stated herein. The single layer of insulation material may consist of only layer 56 for the embodiment depicted in FIG. 7. In this embodiment, the inner surface of the electrostatic shield 52 that is devoid of any insulation material relies on the winding insulation itself to provide the requisite insulation between the electrostatic shield 52 and the corresponding windings. The remaining layer of insulation 56 sandwiching the conducting layer 52 prevents the conducting layer 52 from being in electrical contact with the stator laminations 20.

Slot liner 50 is then used in place of a traditional stator slot liner (such as nomex). Each stator slot liner 50 behaves in a fashion similar to a Faraday shield; and the windings 42 in each slot 22 exhibit a capacitance to the conducting layer, e.g. copper foil, of the corresponding slot liner 50.

According to one aspect, a slot liner 50 is placed inside each stator slot 22. The motor windings 42 are then positioned inside the shielded slot liners 50 in a fashion similar to that employed when installing traditional insulating slot liner windings. During assembly of the stator lamination stackup assembly 30, one side of each slot liner 50 is electrically connected in common with one side of each of the remaining slot liners 50 such that the plurality of slot liners 50 are electrically connected in parallel with one another. According to one aspect, these connections may be implemented using electrical wires. According to another aspect, these connections may be implemented using a conductive ring assembly. Subsequent to connecting the slot liners 50 together, the shielded slot liners 50 are referenced to an electrical location where the C*dv/dt currents can flow into a better electrical path, such as the return node 124 of an electrical inverter 126 driving the motor 128 such as described in further detail herein with reference to FIG. 12. This feature is made possible since the capacitive currents from the stator windings 42 now flow into the thin conductive sheet 52 sandwiched between the insulator layers 54, 56 of the slot liners 50.

Figure 8:
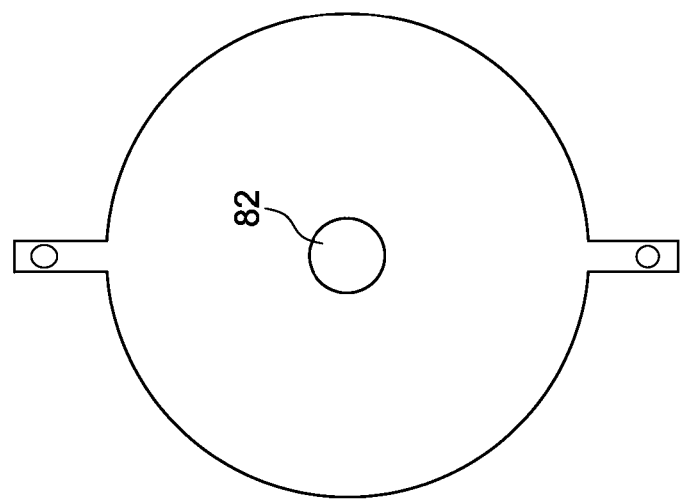
FIG. 8 illustrates an electrically conductive end cap for covering the end windings depicted in FIG. 4.
Figure 8:
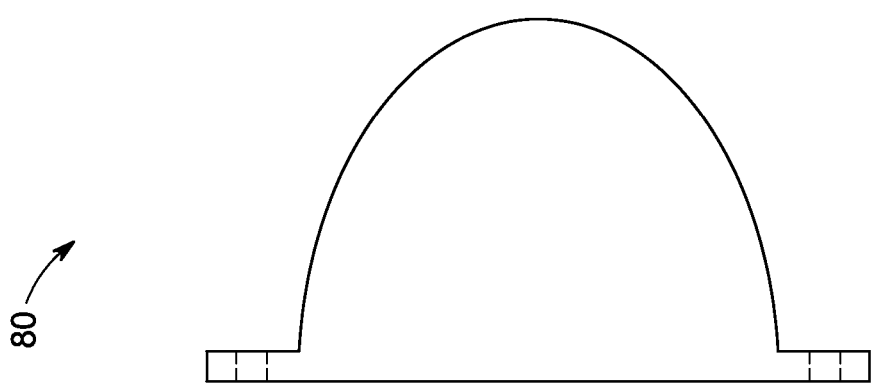

FIG. 8 illustrates an electrically conductive end cap 80 for covering the end winding portions of the stator assembly windings 42 depicted in FIG. 4. Since a small capacitance remains between the end winding portions of the stator assembly windings 42 and both the motor frame and the rotor, the conductive end caps 80 assist in recovering these currents. According to one aspect, conductive end cap 80 completely covers the end winding portions of the stator assembly windings 42. According to one embodiment, the electrically conductive end cap 80 is not connected to the frame of the motor, but instead is connected to a path to return the dv/dt currents in a better EMI path that is more immune to EMI, such as, for example, to return node 124 of FIG. 12. This feature advantageously reduces capacitance from the stator windings 42 to the motor rotor, resulting in improved electromagnetic interference performance and reduced bearing currents.

Figure 9:
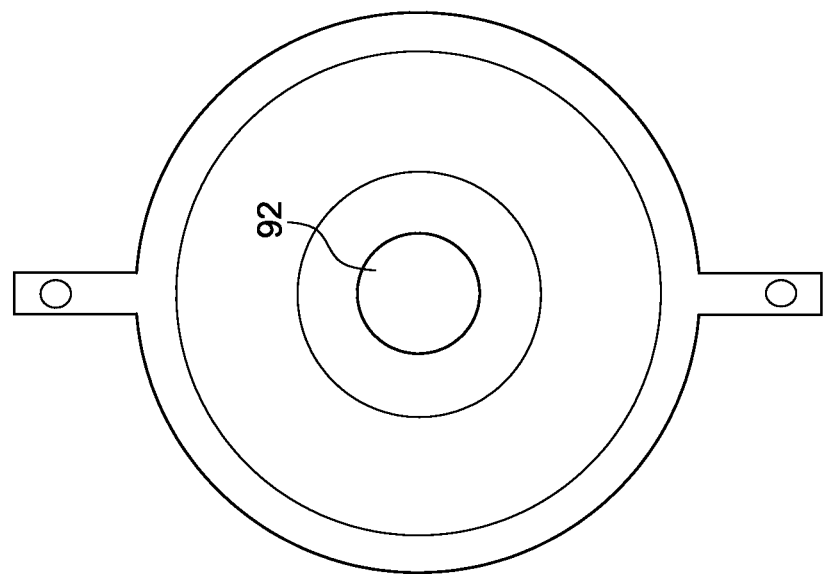
FIG. 9 illustrates another electrically conductive end cap for covering the end windings depicted in FIG. 4.
Figure 9:
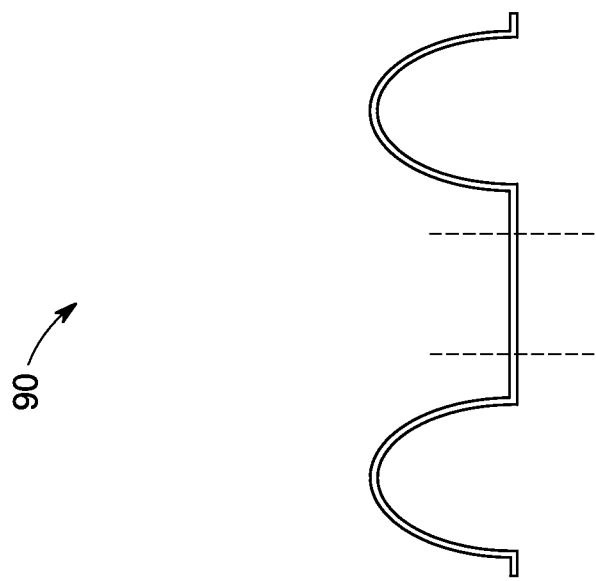

FIG. 9 illustrates another electrically conductive end cap 90 for covering the end windings depicted in FIG. 4. According to one aspect, these conductive end caps 80, 90 can be constructed from a thin conductive material, that may comprise, according to one embodiment, a thickness between about 0.001 inch and 0.05 inch. According to another aspect, these conductive end caps 80, 90 can be constructed from a conductive mesh to allow airflow, and spray oil if required, to pass through the cap 80, 90.

According to one aspect, the purpose of the caps 80, 90 is to capture the capacitive currents, and redirect them to a better electrical path. According to one embodiment, the stator assembly 40 depicted in FIG. 4 employs four (4) conductive end caps, two at each end of the motor stator assembly 40. One end cap is located beneath the stator windings 42, while another end cap is located over the stator windings 42. Since this end cap must not be electrically connected to any other metal parts of the motor, it needs to be electrically insulated using, for example, and without limitation, non-conducting standoffs.

Figure 1:
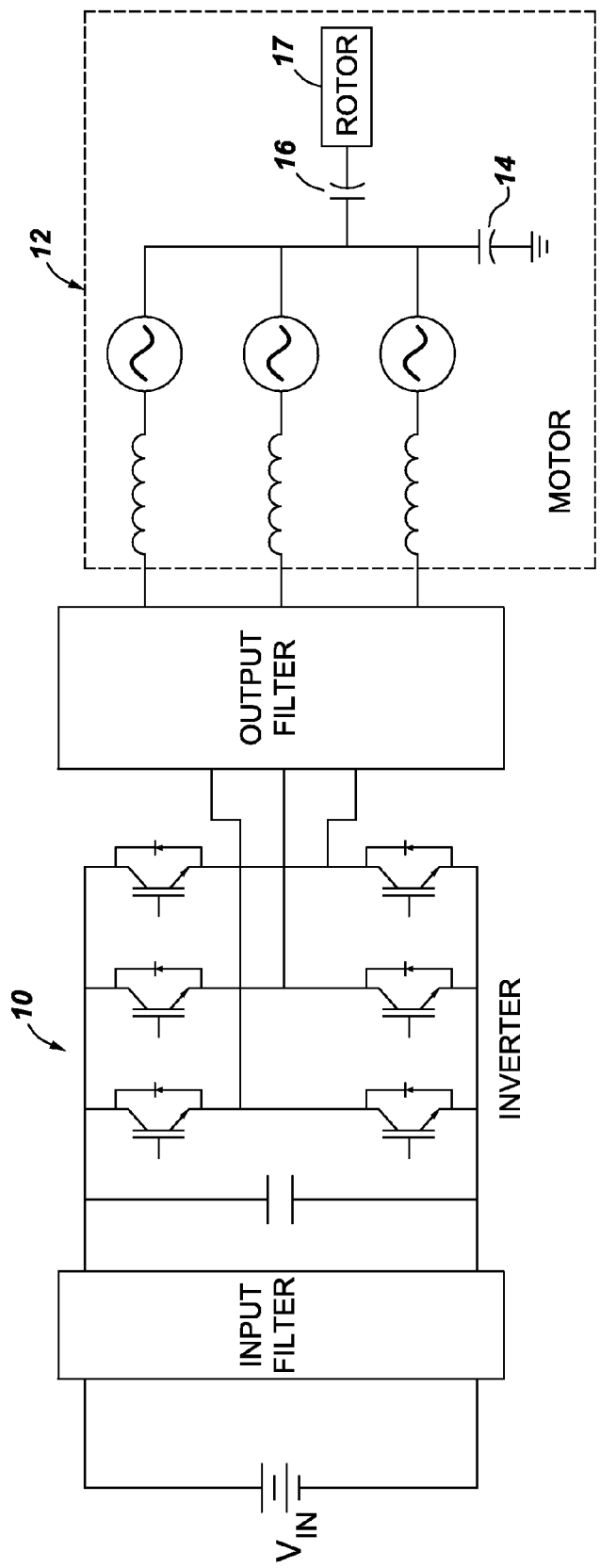
FIG. 1 illustrates a conventional switching inverter architecture.

Each end cap 80, 90 may comprise a corresponding hole 82, 92 in the center of the respective cap to accommodate the rotor shaft of the motor 12 depicted in FIG. 1. These end caps 80, 90 then fully cover the end winding portions of the stator windings 42 from both inside and outside regions of the windings 42 to capture the corresponding capacitive currents. Each end cap 80, 90 is referenced to a preferred location such that the corresponding C*dv/dt current flow can be redirected.

In summary explanation, an electric motor structure has been described that reduces common-mode currents and that reduces motor bearing currents. The reduced currents advantageously result in reduced filter requirements and increased motor bearing life. Thus, the need for large, heavy electromagnetic common-mode filters is greatly reduced. According to one aspect, use of thin insulated copper foil advantageously reduces motor assembly cost, and provides a motor assembly that is reliable and electrically robust from electrical transients, and that further is simple and compatible with existing motor assembly approaches. The embodied motor structures advantageously reduce bearing currents without the need for expensive ceramic bearings, or the use of electrical rotating brushes to shunt capacitive currents to eliminate undesired current flow through the metallic motor bearings. The embodied motor structures further greatly reduce EMI complexity by redirecting stator winding capacitive currents into an electrical shield assembly, allowing these currents to be directed to a more desirable electrical path.

Figure 10:
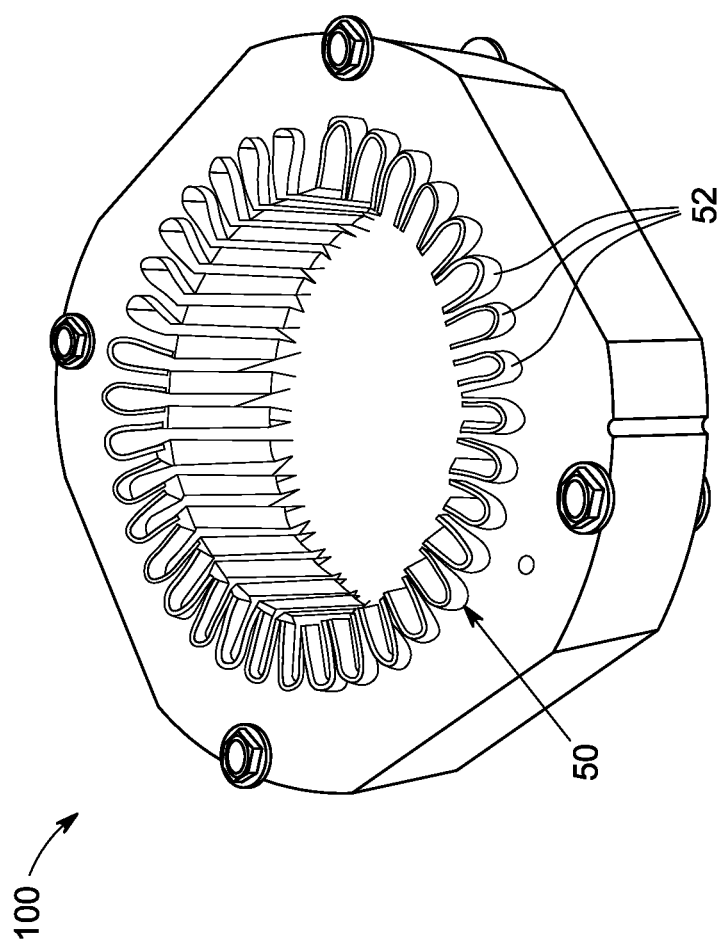
FIG. 10 illustrates an electric motor stator lamination stackup structure with slot liners such as depicted in FIGS. 5 and 6, according to one embodiment.

FIG. 10 illustrates an electric motor stator lamination stackup structure 100 with slot liners 50 such as depicted in FIGS. 5 and 6, according to one embodiment. Each slot liner 50 has a portion of its corresponding electrical conducting layer 52 exposed to allow one side of each slot liner 50 to be electrically connected in common with one side of each of the remaining slot liners 50 such that the plurality of slot liners 50 are electrically connected in parallel with one another. According to one aspect, these connections may be implemented using electrical wires such as depicted for one embodiment in FIG. 11. According to another aspect, these connections may be implemented using a conductive ring assembly as stated herein. Subsequent to connecting the slot liners 50 together, the shielded slot liners 50 are referenced to an electrical location where the C*dv/dt currents can flow into a better electrical path, such as the return node 124 of an electrical inverter driving a motor such as described in further detail herein with reference to FIG. 12. This feature is made possible since the capacitive currents from the stator windings now flow into the thin conductive sheet 52 sandwiched between the insulator layers 54, 56 of the slot liners 50, as stated herein before.

Figure 11:
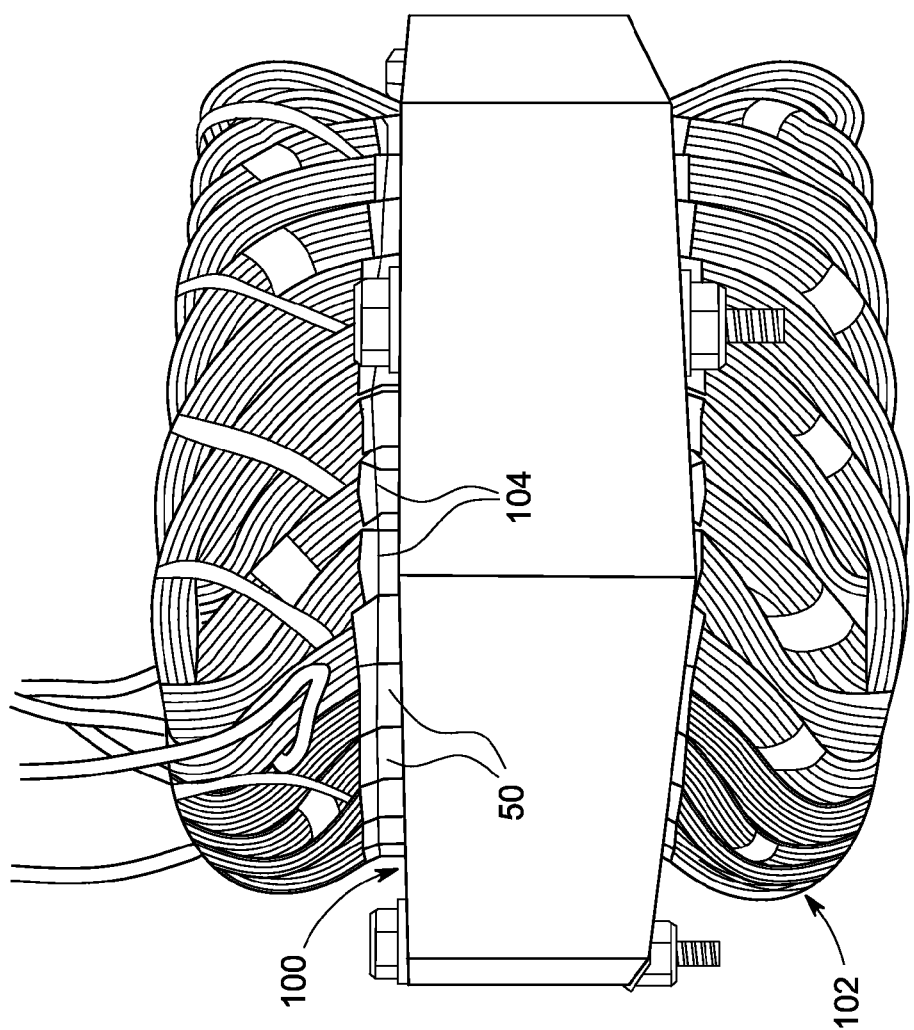
FIG. 11 illustrates the stator lamination stackup structure depicted in FIG. 10 with stator windings placed in the stator slots and the slot liners electrically connected together, according to one embodiment.

FIG. 11 illustrates the stator lamination stackup structure 100 depicted in FIG. 10 with stator windings 102 placed in the stator slots and the slot liners 50 electrically connected together with electrical wires 104, according to one embodiment.

Figure 12:
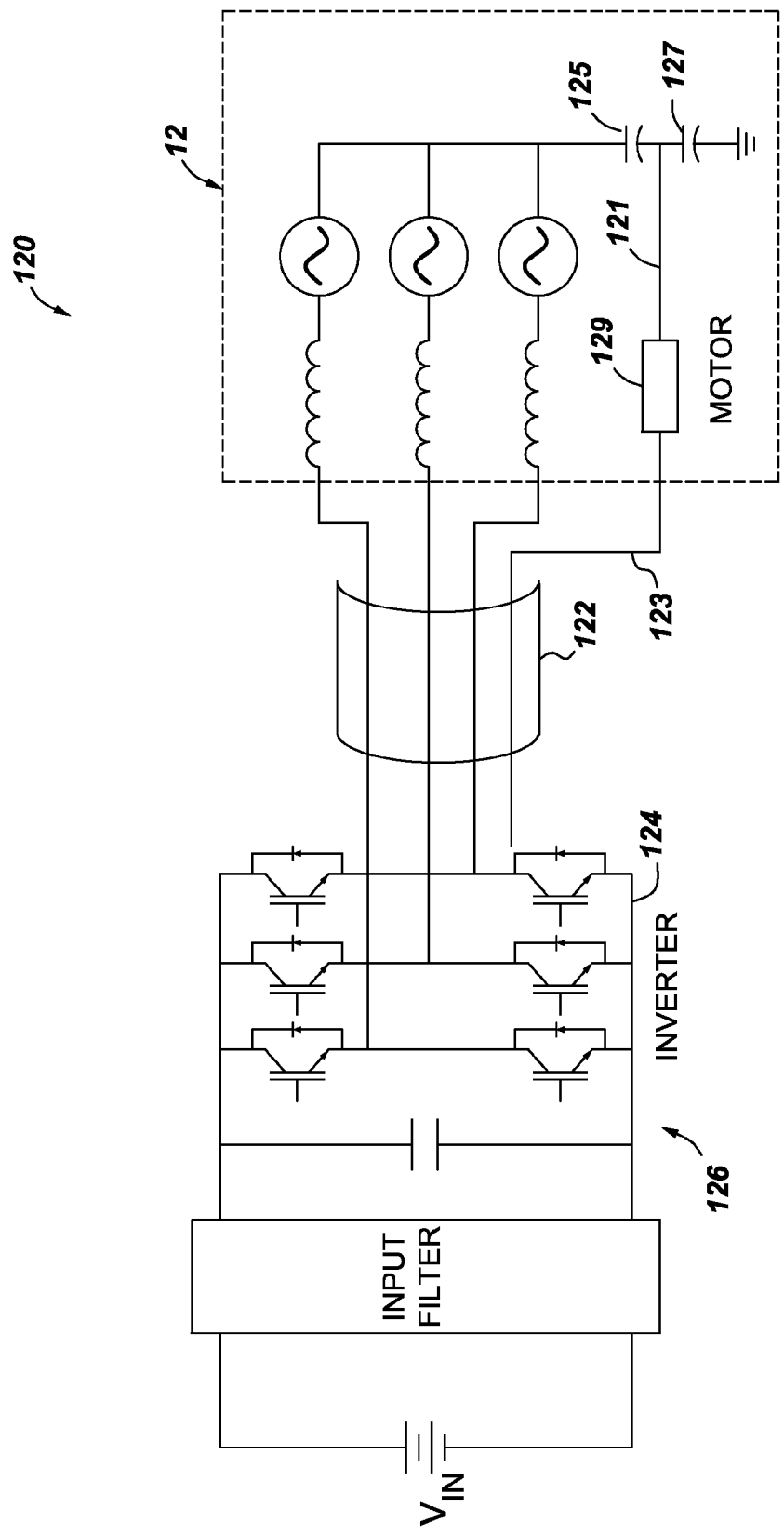
FIG. 12 illustrates an equivalent circuit depiction of a switching inverter system configured with a wire return path for common-mode currents using stator slot shields, according to one embodiment.

FIG. 12 illustrates an equivalent circuit depiction of an electric motor switching inverter system 120 configured with a return node 124 for common-mode currents using stator slot liner shields 52 such as depicted in FIGS. 5-7, according to one embodiment. Subsequent to electrically connecting the slot liner electrostatic shields 52 together in parallel as stated herein before, the shields 52 are referenced to an electrical location where the C*dv/dt currents can flow into a better electrical path, such as return node 124 to reduce common mode currents associated with the electric motor 128, such as the return node of an electrical inverter 126 driving the electric motor 128, as stated herein before. According to one aspect, a common-mode inductor 122 is installed around the three motor winding power lead wires and the additional common mode current return path wire 123 connected to the EMI slot liner 50 to further enhance and promote elimination and/or reduction of common mode currents. According to another aspect, a small resistor 129 that may be in the range from about 0.1 Ohm to about 100 Ohms is placed in series with the slot liner wire 121, to reduce any resonance between the slot liner capacitance and the inductance of the corresponding wire assembly.

Figure 13:
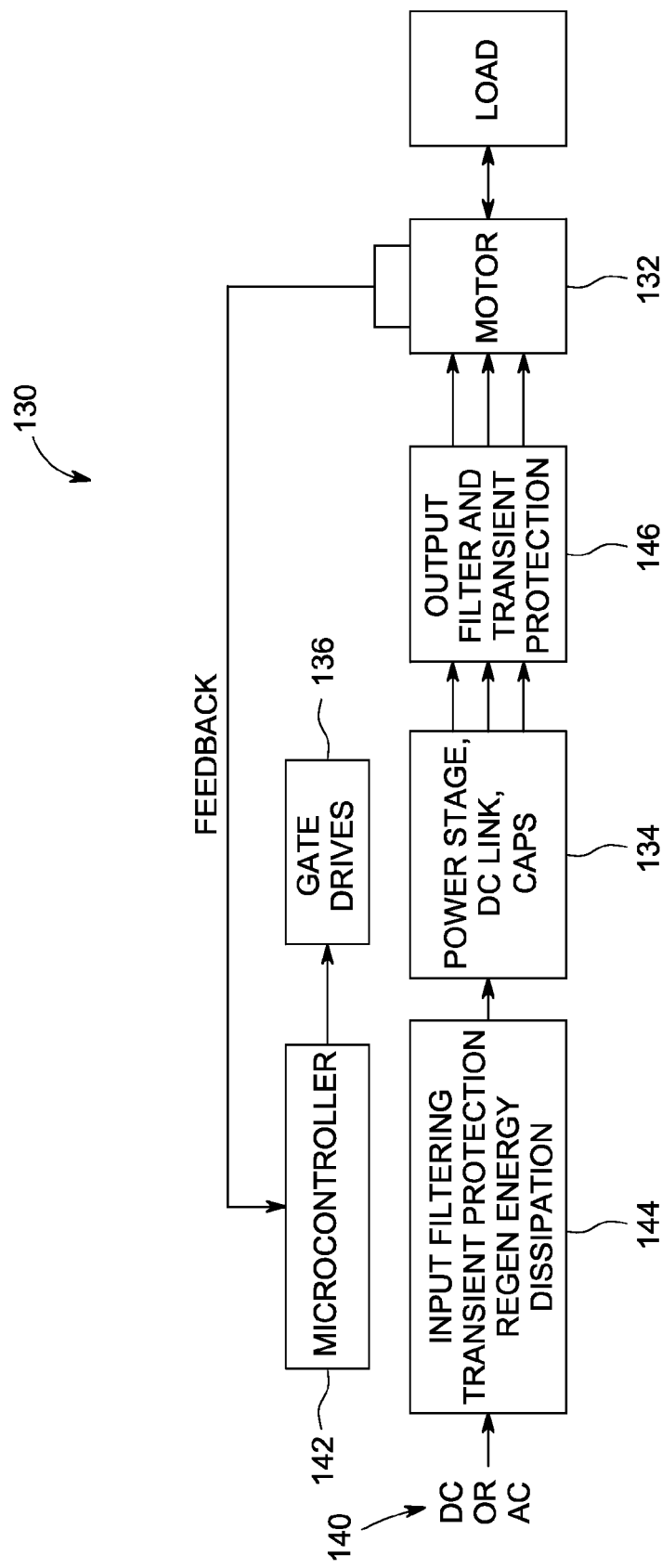
FIG. 13 is a block diagram of a motor control system that employs a motor with slot liners according to one embodiment.

FIG. 13 is a block diagram of a motor control system 130 that employs a motor 132 with slot liners according to one embodiment. Motor control system 130 comprises a power converter stage 134, gate drive electronics 136 that activate the power source 140 that may be an AC or DC power source, a controller 142 such as a digital signal processor for controlling the power source 140 and motor 132, filters 144, 146 placed at the input and output of the power stage 134, and cables that interconnect the various components. The electrostatic shield provided by each motor slot liner 50/conducting layer 52 for the motor 132 advantageously prevents capacitive currents from flowing into the ground structure and creating common-mode EMI currents, and also prevents capacitive currents from flowing into the bearing assembly and causing bearing fluting and pitting problems, thus leading to increased motor bearing life. According to one aspect, the capacitive common-mode current is redirected to flow directly back to the inverter that is one portion of the power stage 134 instead of ground. In this way, any required common-mode filter is smaller, and the motor control system 130 is much less prone to unintentional electromagnetic radiation.

Figure 14:
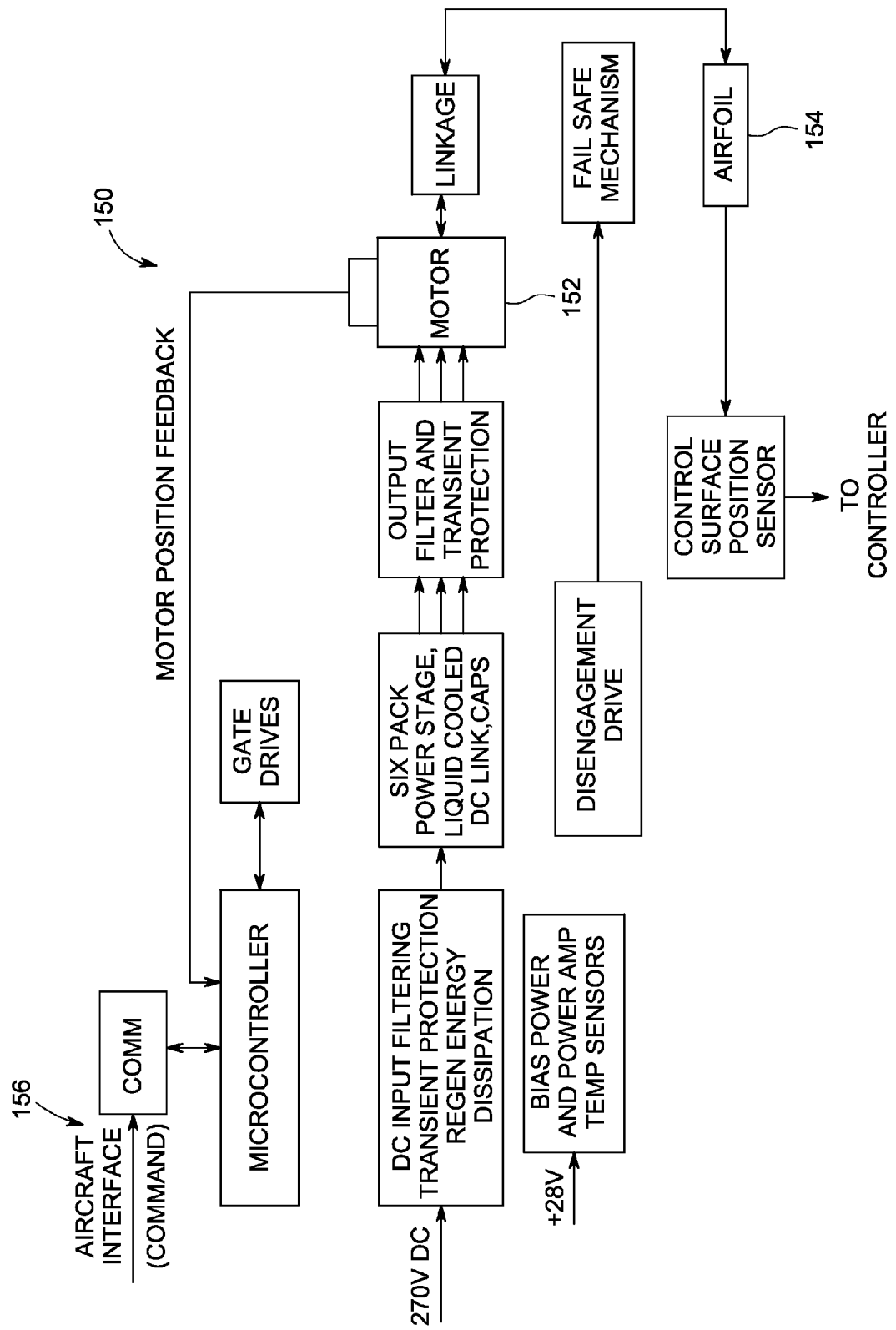
FIG. 14 is a more detailed block diagram of a motor control system that employs a motor with slot liners according to one embodiment.

FIG. 14 is a more detailed block diagram of a motor control system 150 that employs a motor 152 with slot liners 50 according to one embodiment. Motor control system 150 is configured to control a corresponding airfoil 154 in response to commands received via an aircraft interface 156.

Figure 15:
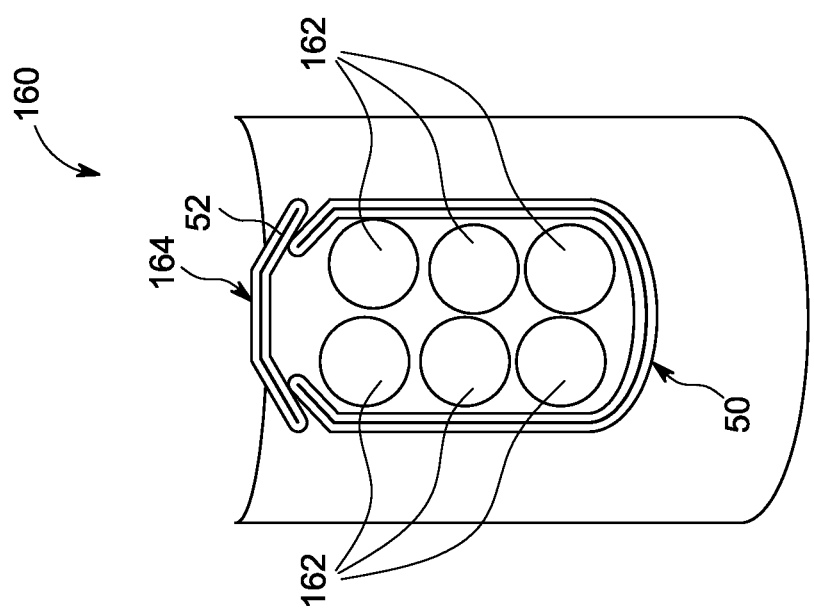
FIG. 15 illustrates a cutout view of a stator slot with an EMI slot cap according to one embodiment.

Looking now at FIG. 15, a cutout view of a stator slot 160 illustrates a stator slot winding 162 disposed within a corresponding stator slot liner 50. In this embodiment, a stator slot cap 164 is inserted into the top portion of the stator slot 160 such that the stator slot liner 50 and the stator slot cap form an EMI shield surrounding the stator slot winding 162. According to one embodiment, the stator slot cap 164 comprises an electrically conductive layer 52 sandwiched between a pair of insulation layers, in similar fashion to stator slot liner 50. Some embodiments may include slot liners and stator slot caps that employ only a single layer of insulation that electrically insulates the electrically conductive layer 52 from the stator core. In such embodiment, the electrically conductive layer relies on the stator winding insulation itself to provide the requisite insulation between the conductive layer and the stator winding(s).

Figure 16:
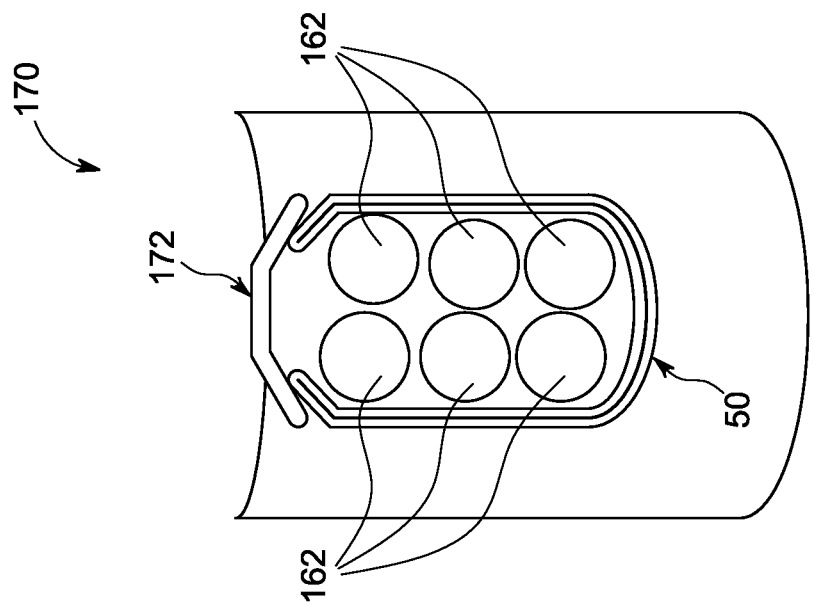
FIG. 16 illustrates a cutout view of a stator slot without an EMI slot cap according to one embodiment.

FIG. 16 is a cutout view of a stator slot 170 illustrating a stator slot winding 162 disposed within a corresponding stator slot liner 50. A stator slot cap 172 is inserted into the top portion of the stator slot 170 to provide an added layer of insulation in the open slot portion of the stator slot 170. The slot cap 172 in this embodiment does not have any electrically conductive shield layer, and thus serves only to provide an added layer of insulation.

The embodiments described herein importantly do not interconnect the electrostatic shields/conductive layers 52 directly to a common motor ground location such as, for example, the motor stator core. Instead, the plurality of conductive layers 52 are electrically connected together in parallel via an interconnecting wire or conductive ring, to provide a common connection point that can be referenced to an electrical location such as a return path/node to a motor inverter, to reduce common mode currents associated with the electric motor. The present inventors discovered that connecting the electrostatic shields 52 to a motor ground location such as a stator core or other motor ground location, results in disadvantageously increasing common mode currents associated with the electric motor.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An electric motor comprising:
one or more motor winding power lead wires;
a stator core comprising a plurality of winding slots;
a plurality of slot liners, each slot liner disposed at least partially within a corresponding winding slot, wherein each slot liner comprises an electrically conductive layer devoid of any insulation on the inner surface and only one layer of insulation, the electrically conductive layer electrically insulated from the stator core by the only one layer of insulation, and further wherein the plurality of conductive layers are electrically connected together in parallel via an interconnecting wire or conductive ring, to provide a common connection point, wherein one end of each of the plurality of conductive layers overlaps the other end and further wherein the interconnecting wire or conductive ring is connected directly to a return node of an electrical inverter that is different from ground via a common mode current return path; and
a common mode inductor around both the one or more motor winding power lead wires and the common mode current return path connected to the interconnecting wire or conductive ring.

2. The electric motor according to claim 1, wherein the electrically conductive layer comprises a thickness between about 0.0001 inch and about 0.005 inch.

3. The electric motor according to claim 1, wherein the only one layer of insulation comprises a thickness between about 0.001 inch and about 0.05 inch.

4. The electric motor according to claim 1, further comprising a plurality of stator windings passing through the plurality of winding slots, wherein the plurality of slot liner conductive layers are electrically connected together in parallel to provide electrostatic shields surrounding the plurality of stator windings.

5. The electric motor according to claim 4, further comprising a plurality of stator winding end caps configured to reduce predetermined capacitive current flow associated with the plurality of stator windings.

6. The electric motor according to claim 5, wherein each end cap is electrically insulated from any metallic portions of a corresponding electric motor.

7. The electric motor according to claim 5, wherein each end cap comprises an opening to accommodate a rotor shaft to pass there through.

8. The electric motor according to claim 4, further comprising a plurality of stator winding end caps configured to capture capacitive current flow associated with end portions of the stator windings.

9. The electric motor according to claim 1, wherein the electrically conductive layer comprises an electrically conductive foil.

10. The electric motor according to claim 1, further comprising a resonance reduction resistor in series with the interconnecting wire or conductive ring, wherein the resonance reduction resistor reduces resonance between a corresponding slot liner capacitance and a corresponding slot liner wire assembly inductance.

11. An electric motor comprising:
one or more motor winding power lead wires;
a stator core comprising a plurality of winding slots;
a plurality of stator windings passing through the plurality of winding slots;
a plurality of slot liners, each slot liner comprising an electrically conductive layer disposed between a corresponding stator winding and the stator core, each conductive layer devoid of any insulation on the inner surface and comprising only one layer of insulation, the electrically conductive layer electrically insulated from its corresponding stator winding and the stator core by the only one layer of insulation, wherein the plurality of conductive layers are electrically connected together in parallel via an interconnecting wire or conductive ring, to provide a common connection point, wherein one end of each of the plurality of conductive layers overlaps the other end and further wherein the interconnecting wire or conductive ring is connected directly to a return node of an electrical inverter that is different from ground via a common mode current return path; and
a common mode inductor around both the one or more motor winding power lead wires and the common mode current return path connected to the interconnecting wire or conductive ring.

12. The electric motor according to claim 11, wherein the conductive layer comprises a thickness between about 0.0001 inch and about 0.005 inch.

13. The electric motor according to claim 11, further comprising a plurality of stator winding end caps configured to reduce predetermined capacitive current flow associated with the plurality of stator windings.

14. The electric motor according to claim 13, wherein each end cap is electrically insulated from any metallic portions of a corresponding electric motor.

15. The electric motor according to claim 13, wherein each end cap comprises an opening to accommodate a rotor shaft to pass there through.

16. The electric motor according to claim 11, wherein the one layer of insulation comprises a thickness between about 0.001 inch and about 0.05 inch.

17. The electric motor according to claim 11, wherein the electrically conductive layer comprises an electrically conductive foil.

18. The electric motor according to claim 11, further comprising a plurality of stator winding end caps configured to capture capacitive current flow associated with end portions of the stator windings.

19. The electric motor according to claim 11, further comprising a resonance reduction resistor in series with the interconnecting wire or conductive ring, wherein the resonance reduction resistor reduces resonance between a corresponding slot liner capacitance and a corresponding slot liner wire assembly inductance.

20. An electric motor comprising:
one or more motor winding power lead wires;
a stator core comprising a plurality of winding slots;
a plurality of stator windings passing through the plurality of winding slots; and
a plurality of stator slot liners, each slot liner configured to provide an electrostatic shield at least partially surrounding a corresponding stator slot winding, wherein each of the plurality of electrostatic shields is devoid of any insulation on the inner surface and comprises only one layer of insulation and is electrically insulated from the stator core by the only one layer of insulation and further wherein the plurality of electrostatic shields are connected together in parallel via an interconnecting wire or conductive ring, to provide a common connection point, and further wherein the interconnecting wire or conductive ring is connected directly to a return node of an electrical inverter that is different from ground via a common mode current return path wherein one end of each of the plurality of electrostatic shields overlaps the other end; and
a common mode inductor around both the one or more motor winding power lead wires and the common mode current return path connected to the interconnecting wire or conductive ring.

21. The electric motor according to claim 20, further comprising a plurality of stator winding end caps configured to reduce predetermined capacitive current flow associated with the plurality of stator windings.

22. The electric motor according to claim 21, wherein each end cap is electrically insulated from any metallic portions of a corresponding electric motor.

23. The electric motor according to claim 20, wherein the electrically conductive layer comprises an electrically conductive foil.

24. The electric motor according to claim 23, wherein the conductive foil comprises a thickness between about 0.0001 inch and about 0.005 inch.

25. The electric motor according to claim 20, wherein the one layer of insulation comprises a thickness between about 0.001 inch and about 0.05 inch.

26. The electric motor according to claim 20, further comprising a plurality of stator winding end caps configured to capture capacitive current flow associated with predetermined end portions of the stator windings.

27. An electric motor configured with a plurality of stator slot liners, each slot liner configured to provide an electrostatic shield at least partially surrounding a corresponding stator slot winding, wherein each of the plurality of electrostatic shields is devoid of any insulation on the inner surface and comprises only one layer of insulation and is electrically insulated from the stator core by the only one layer of insulation and further wherein the plurality of electrostatic shields are connected together in parallel via an interconnecting wire or conductive ring, and referenced directly to a return node of an electrical inverter that is different from ground via a common mode current return path to reduce common mode currents associated with the electric motor, wherein one end of each of the plurality of electrostatic shields overlaps the other end and further wherein the electric motor further comprises one or more motor winding power lead wires and a common mode inductor surrounding both the one or more motor winding power lead wires and the common mode current return path connected to the interconnecting wire or conductive ring.

28. The electric motor according to claim 27, wherein the one layer of insulation comprises a thickness between about 0.001 inch and about 0.05 inch.

29. The electric motor according to claim 27, further comprising a plurality of stator winding end caps configured to reduce predetermined capacitive current flow associated with the plurality of stator windings.

30. The electric motor according to claim 29, wherein each end cap is electrically insulated from any metallic portions of the electric motor.

31. The electric motor according to claim 27, further comprising a plurality of stator winding end caps configured to capture capacitive current flow associated with end portions of the stator windings.

32. The electric motor according to claim 27, wherein each electrostatic shield comprises an electrically conductive foil.

33. The electric motor according to claim 32, wherein the conductive foil comprises a thickness between about 0.0001 inch and about 0.005 inch.

34. The electric motor according to claim 27, further comprising a resonance reduction resistor in series with the interconnecting wire or conductive ring, wherein the resonance reduction resistor reduces resonance between a corresponding slot liner capacitance and a corresponding slot liner wire assembly inductance.

* * * * *